UNITED STATES PATENT OFFICE.

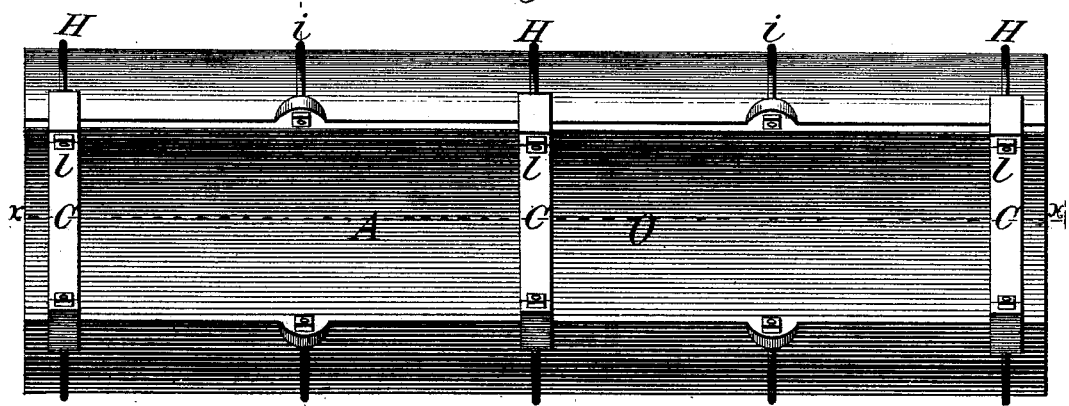
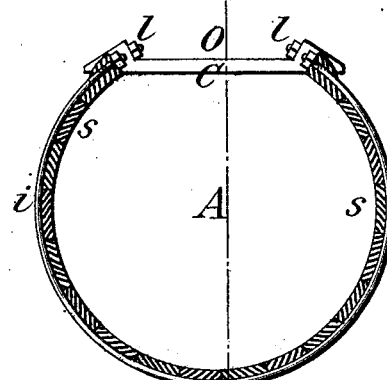
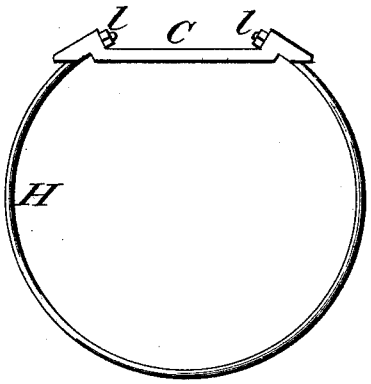
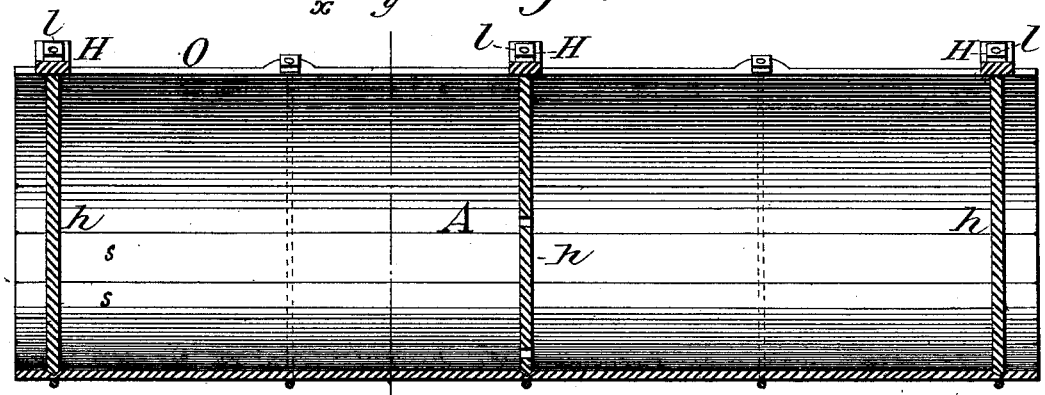

HENRY ADAMS AND CLINTON C. HAYNES, OF WILMINGTON, VERMONT.

LIQUID-HOLDER.

SPECIFICATION forming part of Letters Patent No. 229,576, dated July 6, 1880.

Application filed February 5, 1880.

*To all whom it may concern:*

Be it known that we, HENRY ADAMS and CLINTON C. HAYNES, of Wilmington, in the county of Windham and State of Vermont, have invented a certain new and useful Improvement in Liquid-Holders; and we do hereby declare that the following is a full, clear, and exact description of the invention, which will enable others skilled in the art to which it appertains to make and use the same, reference being had to the drawings which form a part of the specification.

In the accompanying drawings, Figure 1 represents a top-plan view of our improved liquid-holder; Fig. 2, a vertical cross-section on line $y\,y$; Fig. 3, a vertical longitudinal section on line $x\,x$; Fig. 4, the hoop or rod and cap clasping the same.

Similar letters of reference indicate corresponding parts.

The object of our invention is to furnish a cheap and effective holder for storing sap gathered from the sugar-maple, and also to store water to feed portable engines, and many other purposes, being made round or cylindrical and resting upon one side. When in use it can be blocked with a small piece of wood on each side under the bottom. On the top the opening is formed by cutting off a portion of the circle longitudinally, as will be hereinafter more fully described, and pointed out in the claim.

A represents the liquid-holder, made round or cylindrical, of any desired capacity, and with one or more compartments. The sides are formed with staves S S, being fitted with crozes to correspond with heads $h\,h$. The staves are thus fitted until the desired opening is reached, the same being firmly bound by the rods H H, there being a nut, $l\,l$, on each end of the rod, the rod passing through each end of cap C, a shoulder being cut on the under side to correspond with the edge of the staves, also a shoulder on the opposite side to receive the nut. By turning said nut down with a wrench the staves are firmly bound to the heads $h\,h$, not as other vessels are hooped, but with a sliding motion.

In case of shrinkage it is well known that in vessels made the common way, by swelling and shrinking the heads become too large, and will not hold until swelled up again. By our process the trouble is wholly obviated.

The rods $i\,i$ are secured by passing through the top stave edgewise and giving tension to the staves in line of the circumference.

The opening O gives access to the inside for cleansing and examining the contents, &c.

Having thus fully described our invention, what we claim as new, and desire to secure by Letters Patent, is—

The liquid holder A, having the opening O, and provided with rods H H and nuts and caps C, substantially as and for the purpose set forth.

In testimony whereof we have signed our names and affixed our seals to this specification.

HENRY ADAMS. [L. S.]
CLINTON C. HAYNES. [L. S.]

In presence of—
W. N. DICKINSON,
F. E. WHITE.